(No Model.)
W. JONES.
CARRIAGE AXLE.
No. 286,139. Patented Oct. 2, 1883.
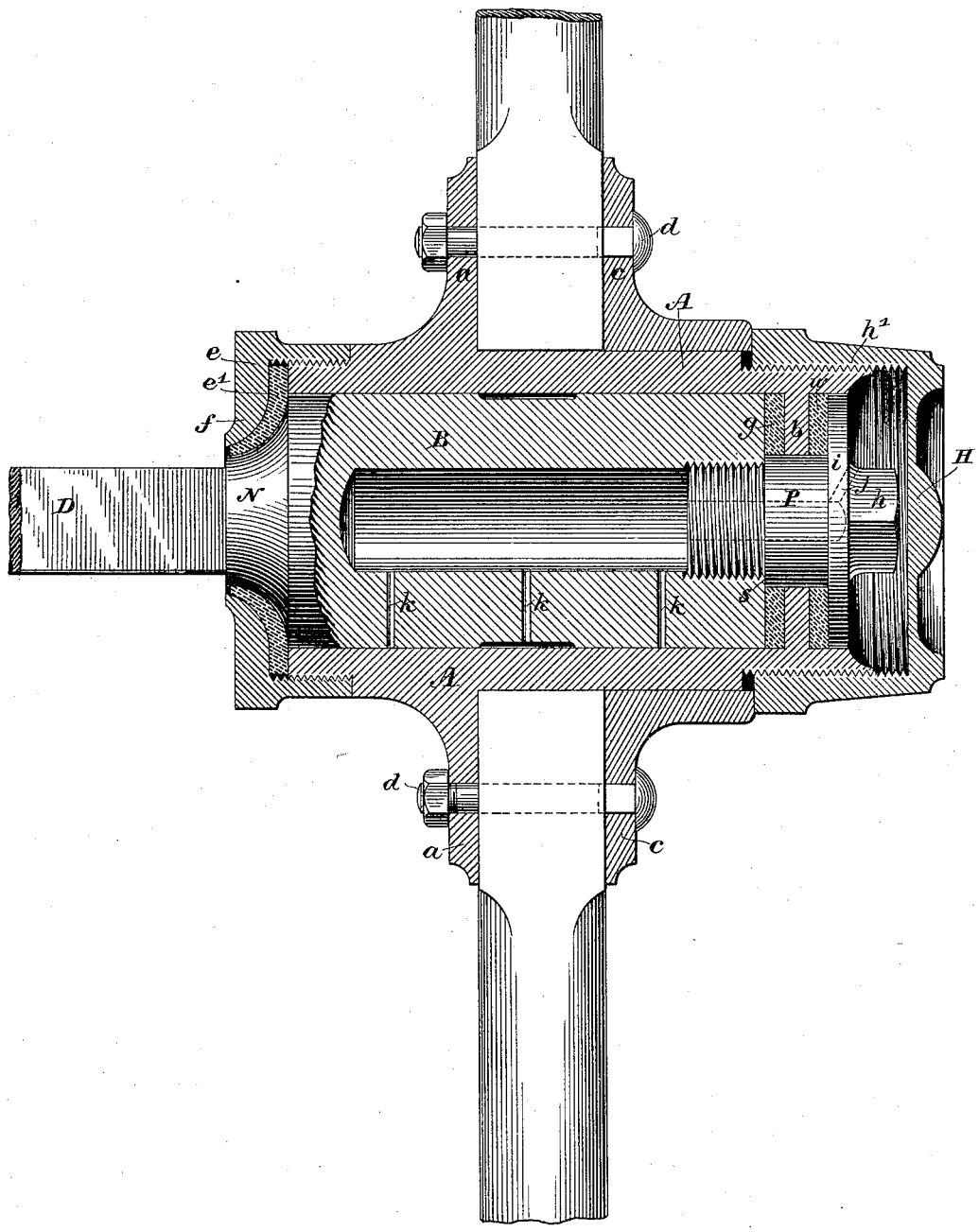
WITNESSES
Wm A. Skinkle.
Geo. W. Breck.
INVENTOR
Willis Jones,
By his Attorneys
Pope Edgecomb & Butler.

UNITED STATES PATENT OFFICE.

WILLIS JONES, OF BROOKLYN, NEW YORK.

CARRIAGE-AXLE.

SPECIFICATION forming part of Letters Patent No. 286,139, dated October ?, 1883.

Application filed June 29, 1883. (No model.)

*To all whom it may concern:*

Be it known that I, WILLIS JONES, a citizen of the United States, and a resident of Brooklyn, in the county of Kings and State of New York, have invented certain new and useful Improvements in Carriage Axles and Hubs, of which the following is a specification.

The object of my invention is to improve the construction of the arms of axles for connecting the wheel more securely thereto and more effectually preventing breakage.

My invention also has for its object the provision of an improved hub for rotating upon said arm.

The exact subject-matter claimed as new will be hereinafter specifically set forth.

The accompanying drawing is a transverse vertical section of an axle-arm and hub embodying my improvements, showing their relations to each other and the means by which they are connected together.

In the drawing, A represents the main body of the hub, of the form which I prefer to employ in connection with my improved axle-arm, which hub is preferably made of metal, and consists, principally, of a cylindrical shell which is provided with annular lateral projections or flanges $a$ and $b$, the former extending outward for the attachments of the spokes, and the latter projecting inward for holding the axle in place. Both of these projections may be cast in one piece with the body of the hub. An annular flange, $c$, similar in form and proportions to the projection $a$, is fitted upon the exterior of the body A. The ring $c$ and annular projection $a$ serve by means of the bolts $d$ to clamp the spokes in place. The exact manner in which the spokes are united to the hub is well known, and for this reason a more detailed description thereof is deemed unnecessary.

I form that portion of the axle which is inclosed in the hub of considerably greater diameter than the thickness of the body of the axle for the purposes of giving greater wearing-surface and strength and facilitating the automatic lubrication of the hub. I make the junction of the main portion D and enlarged portion B of the axle in the form of a neck, N, of a gradually-increasing size, for giving the utmost possible strength to that portion of the axle.

I have illustrated the arm as being cylindrical in shape, and while this is the form I prefer to employ, the arm may be somewhat tapered from the neck N to its outer extremity, if desired.

A washer, $e'$, of leather or similar material, is made to surround the neck N of the axle, as shown. This washer is held in place by means of the collar $e$. A portion of the interior of this collar is screw-threaded and made to fit upon the corresponding screw-threaded end of the hub, as shown at $e$. When the collar $e$ is screwed in place upon the hub, the flange $f$ (having its inner face curved to correspond with the curved neck of the axle) bears against the washer $e'$, and thus secures the arm B of the axle in place within the hub. As is well known, metallic axles are usually manufactured in two pieces and their bodies welded together in the middle of their length; and therefore the collar $e$ should be made to encircle the axle by being slipped over the end to be welded before its unison with the other portion. The washer $e'$ may also be slipped over the end of the axle before welding; or it may be divided by a radial slit, and so put on after welding.

Against the annular projection $b$ of the hub A, I place another leather washer, $g$, which rests against the extremity of the axle-arm. The interior of the end of the arm B is screw-threaded for a short distance, and into this cavity is screwed the plug P. This plug preferably is formed with a squared extremity, $h$, to enable it to be turned by means of a wrench. The plug is made hollow for a portion of its length, and is provided with an annular flange, $i$, making the greatest diameter of the plug equal to the interior diameter of the outer end of the hub. The plug P is provided with a shoulder, $s$, which latter is designed to be tightly screwed against the end of the arm, so as to allow the hub to revolve around the plug. The latter, when screwed in place, secures the washer $g$ in position, and holds the washer $w$ between projection $b$ and flange $i$. By means of these washers an easy movement is given to the hub, and, being preferably made of leather or similar elastic material, injury to the parts caused by longitudinal shocks is almost entirely avoided. I prefer to form a hole, $j$, extending obliquely from the exterior to the interior of the plug P, for conveying lubricating-oil to the interior of the axle. By means of the hollow arm of the latter a considerable quantity of oil may be stored therein, and by means of the series of holes $k\ k\ k$, extending radially from the interior to the exterior of the extremity of the arm B, the oil contained in the hollow portion of the arm may be automatically conveyed to the exterior of the arm and interior of the hub. A cap, H, screw-threaded in its interior, is fitted upon the exterior of the correspondingly screw-threaded extremity of the hub, as shown at $h'$, and serves to prevent the accumulation of dust and gives finish to the hub.

By means of my improvements I am enabled to produce an axle-arm possessing the utmost possible strength, and owing to the secure manner in which the axle is united with the hub their accidental separation is rendered almost impossible, since, should the cap H and plug P both become detached, the axle would still be held in place by means of the collar $e$.

It may be preferable in some instances (and especially when the hub and axle are to be employed in connection with vehicles designed for light work) to dispense with the plug P. This may be done by so forming the projection $b$ that it will extend across the end of the hub, when the axle will be held against the then permanently-closed end of the hub by means of the collar $e$. In this arrangement an aperture in the end of the hub may be made to allow of the admission of oil.

The advantages resulting from my improved construction of the axle-arm may be enumerated as follows: First, owing to the greatly-increased diameter of the arm, and its neck of gradually-increasing size, greatly increased strength is given to the axle, and the breakage of the same at the point where the arm joins the body of the axle, which so often occurs in the usual form of axle with square shoulders, is rendered almost impossible; second, the increased diameter of the arm gives greater wearing-surface than heretofore attained, thus reducing the play between the arm and hub, caused by the friction of the parts, under any given amount of usage; third, the increased diameter of the arm allows of a large oil-reservoir being formed without unduly decreasing the strength of the arm, and thus enables the automatic supply of oil to the wearing-surfaces to continue for a correspondingly-increased length of time.

I claim as my invention—

1. The combination, substantially as hereinbefore set forth, with the axle D, having the curved neck N and enlarged hollow arm B, of the hub A, having the projection $b$ and the collar $c$.

2. The combination, substantially as hereinbefore set forth, of the hollow cylindrical hub having the annular projection $b$, an axle having an enlarged arm, and the screw-threaded plug P, having shoulder $s$ and flange $i$.

3. The combination, substantially as hereinbefore set forth, of a vehicle-axle having its arm of a greater diameter than the thickness of its body, and having a neck between said arm and body, of gradually-increasing thickness from the body to the arm, a collar surrounding said neck, a hole formed longitudinally in said arm, a washer intervening between said neck and collar, and the washers $g$ and $w$, respectively intervening between the extremity of said arm and projection $b$, and between projection $b$ and flange $i$.

4. The combination, substantially as hereinbefore set forth, of the body of the axle D, the enlarged hollow arm B, the neck N, the collar $e$, surrounding said neck, the intervening washer $i$, the screw-threaded hollow plug P, having shoulder $s$ and flange $i$, the cap H, and the washers $g$ and $w$, respectively intervening between the extremity of said arm and projection $b$, and between projection $b$ and flange $i$.

In testimony whereof I have hereunto subscribed my name this 27th day of June, A. D. 1883.

WILLIS JONES.

Witnesses:
DANIEL W. EDGECOMB,
CARRIE E. DAVIDSON.